(12) United States Patent
Vaitkus et al.

(10) Patent No.: US 6,619,876 B2
(45) Date of Patent: Sep. 16, 2003

(54) COAXIAL CONNECTOR APPARATUS AND METHOD

(75) Inventors: Vytas J. Vaitkus, Orland Park, IL (US); John H. Dykstra, Tinley Park, IL (US)

(73) Assignee: Andrew Corporation, Orland Park, IL (US)

(*) Notice: Subject to any disclaimer, the term of this patent is extended or adjusted under 35 U.S.C. 154(b) by 0 days.

(21) Appl. No.: 10/078,237

(22) Filed: Feb. 18, 2002

(65) Prior Publication Data

US 2003/0156900 A1 Aug. 21, 2003

(51) Int. Cl.[7] ................................................. F16B 7/20
(52) U.S. Cl. .................... 403/349; 403/353; 439/578; 439/584; 439/352
(58) Field of Search ................................ 403/348, 349, 403/350, 351, 352, 353; 439/332, 314, 316, 578, 583, 584, 585, 352

(56) References Cited

U.S. PATENT DOCUMENTS

| | | | |
|---|---|---|---|
| 3,671,922 A | | 6/1972 | Zerlin et al. .................. 339/74 |
| 3,694,793 A | | 9/1972 | Concelman ................... 339/91 |
| 4,037,909 A | * | 7/1977 | Trompeter et al. ........... 339/177 |
| 4,138,181 A | | 2/1979 | Hacker et al. ................ 339/45 |
| 4,268,115 A | | 5/1981 | Slemon et al. ............. 350/96.21 |
| 4,545,633 A | | 10/1985 | McGeary ..................... 339/42 |
| 4,941,846 A | * | 7/1990 | Guimond et al. ........... 439/578 |
| 5,269,701 A | | 12/1993 | Leibfried, Jr. .............. 439/578 |
| 5,695,365 A | * | 12/1997 | Kennedy et al. ............ 439/638 |
| 5,802,710 A | | 9/1998 | Bufanda et al. ............. 439/578 |
| 5,993,253 A | | 11/1999 | Sai .............................. 439/578 |
| 6,109,963 A | * | 8/2000 | Follingstad et al. ........ 439/578 |
| 6,210,221 B1 | | 4/2001 | Maury ........................ 439/578 |
| 6,257,919 B1 | | 7/2001 | Cutler et al. ................ 439/441 |
| 6,267,612 B1 | | 7/2001 | Arcykiewicz et al. ...... 439/253 |
| 6,361,348 B1 | * | 3/2002 | Hall et al. ................... 439/352 |

* cited by examiner

Primary Examiner—Lynne H. Browne
Assistant Examiner—Michael P. Ferguson
(74) Attorney, Agent, or Firm—Jenkens & Gilchrist, P.C.

(57) ABSTRACT

A coaxial connector of the type wherein an inner connector member of a female connector is adapted for secure engagement with a connector member of a male connector. The coaxial connector is positioned around the connector member of the male connector and the connector member of the female connector when the coaxial connector is in its locked position. A spring basket with an angular frontal surface is positioned around the connection member of the male connector. A sleeve with an angular internal surface for engaging the angular frontal surface of the spring basket is reciprically positioned around the spring basket and the connection member of the male connector. The sleeve has at least one locking groove that extends substantially parallel to the major axis along a portion of the body thereof. A spring nut is provided with a hollow front end disposed within the sleeve and at least one upstanding locking finger disposed within the at least one locking grove of the sleeve. A spring is partially disposed within the hollow front end of the spring nut, and the spring is positioned between the spring nut and the connection member of the male connector respectively such that when the spring nut is pushed in a forward axial direction relative to the sleeve to lock the coaxial connector, the spring is compressed and the internal angular surface of the sleeve engages the angular frontal surface of the spring basket forcing the spring basket to apply a radially inward force on the connection member of the female connector, holding the female connector in place. The spring provides an axial force on the connection member of the male connector and forces the connection member of the male connector into engagement with the connection member of the female connector.

8 Claims, 14 Drawing Sheets

COAXIAL CONNECTOR APPARATUS AND METHOD

BACKGROUND OF THE INVENTION

1. Field of the Invention

The present invention relates generally to coaxial cable connectors and, more particularly, but not by way of limitation, to coupling mechanisms for coaxial cable connectors.

2. History of Related Art

A coaxial cable is generally characterized by having an inner conductor, an outer conductor, and an insulator between the inner and outer conductors. The inner conductor may be hollow or solid. At the end of coaxial cable, a connector is attached forming a coaxial cable assembly and facilitating mechanical and electrical coupling of the coaxial cable to electronic equipment and other cables. The method of and apparatus for the mechanical and electrical coupling of the connector to the coaxial cable has for a number of years been the subject of considerable design innovation. For example, to effectuate electrical contact between the inner contact of the connector and the inner conductor of the cable, the inner contact may be soldered or otherwise secured in some other fashion to the inner conductor. To effectuate electrical contact between the body member of the connector and the outer conductor of the cable, a myriad of design issues arise. One design issue relates to the configuration of the outer conductor of the cable. A connector for a coaxial cable having a helically corrugated outer conductor and a hollow, plain cylindrical inner conductor is, for example, described in U.S. Pat. No. 3,199,061 (Johnson et al.). The Johnson patent describes a self-tapping connector. Such connectors are time-consuming to install and relatively expensive to manufacture. Also, when the inner connector is made of brass, over-tightening causes the threads to strip off the connector rather than the end portion of the inner conductor of the cable, and thus the connector must be replaced.

More recent coaxial connector designs have addressed methods of and apparatus for quickly and easily attaching a connector to a coaxial cable with improved efficiency. U.S. Pat. No. 5,802,710, assigned to the assignee of the present invention, and incorporated herein by reference, teaches a method of attaching a connector to a coaxial cab e that allows the depth of the inner c contact relative to the body member of the connector to be easily controlled. In this manner, the depth of the inner contact relative to the body member of the connector is consistent from one assembly to the next. The method set forth therein also provides a moisture barrier between the cable and the connector without the use of rubber O-rings, thereby protecting the connector from detrimental environmental conditions.

Another very important design aspect of coaxial connectors has been, and currently is, the coupling mechanism that facilitates an interlocking engagement between mating male and female coupling sections. For example, U.S. Pat. No. 4,941,846 (Guimond, et al.) describes a quick connect/ disconnect connector for coaxial cables which can be used with unmodified standard coaxial couplings having externally facing threads. The connector includes a connector housing having a plurality of movable fingers which have inwardly facing ridge portions that mesh with the externally facing threads of the coaxial coupling. When the connector coaxial line segment is pushed onto the coupling, the fingers move in such a way as to allow the ridge portions to interlock with the screw threads. The connector can be used for microwave and can also be used as a SMA or TNC connector. Disconnecting is accomplished by pulling the sleeve backward which releases the fingers from their interlocking position.

Another connector design addressing the coupling mechanism is set forth and shown in U.S. Pat. No. 4,138,181 (Hacker, et al.). The Hacker patent describes a releasable electrical connector having a receptacle component and a plug component which can be mated by relative rotation between the components and separated by a straight breakaway force. Pins on the receptacle components are engaged in a spring biased sleeve in the plug component. Moreover, a spring is provided around the male connector and biases the connector body toward the receptacle to provide better contact between the connectors.

Likewise, U.S. Pat. No. 4,545,633 (McGeary) generally describes a male plug and a female receptacle that are connected together by means of fingers on the male plug which are spread and are held by the female receptacle. The connector is unplugged by sliding a sleeve rearwardly against an internal spring and moving the locking tabs to a unlocked position.

Similarly, U.S. Pat. No. 6,267,612B1 (Arcykiewicz, et al.) teaches an adaptive coupling mechanism incorporating a multi-lined locking ring to engage the threads of a conventional rotational coupling system member.

These and related designs exemplify the innovation in the effort for improved high performance coaxial cable connector couplings that are easy and fast t install and uninstall one to the other under field conditions and which may also be economically manufactured. However, these push-pull type connectors are typically insecure and, by definition, release when a sufficient axial force is applied.

The most common male to female coaxial connector used in the prior art is that of a threaded coupling assembly on the male end which screws on to a standard size female end. While this connector provides good physical stability, it is quite time consuming to connect or disconnect such coaxial connectors. The need for further improved male coaxial connector for coupling mating connector members of a coaxial connector with an enhanced axial interface force still remains.

It has been well established that connectors incorporating push-pull coupling assemblies permit faster installation than the threaded coupling assemblies. Typical push-pull couplings also often provide more reliable locking mechanisms because vibrations will have a less tendency to cause disconnection as compared to threaded connectors which are more prone to the deleterious effect of vibration. There are obviously no "cross-threading" problems with push-pull connectors, because such problems are by definition the problem of threaded engagement. Also, push-pull connectors are quicker to connect or disconnect. However, threaded coupling assemblies, when installed correctly, are more physically secure (they do not disconnect when something pulls on them) whereas push-pull connectors, by definition, disconnect when a sufficient axial force is applied.

It would be a distinct advantage to provide a connector that quickly connects with a standard threaded female coaxial end, without having to screw the connector on to the female end, that provides efficient and reliable coupling of the male and female connector members under field conditions. Also, it would also be advantageous if the connector did not disengage upon the application of a pure axial force. Enhanced coupling aspects, such as increased axial compression between male and female connector members, provide improved reliability. The present invention provides such a reliable coaxial connector coupling with a reciprocally mounted sleeve positioned around a connector member adapted for enhanced axial interface forces between said male and female connector members. The push-pull connector described herein includes at least one spring for urging the female connector into engagement with the male connector while providing both locked and unlocked positions therebetween.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PREFERRED EMBODIMENTS

It has been discovered that a reciprocally mounted coupling assembly formed with means for enhancing the axial interface force between male and female connector members of a coaxial connector can provide a myriad of advantages and improved reliability. The coupling assembly of the coaxial connector of the present invention is constructed for axially biasing the mating coupling members of the coaxial connector of the present invention into each other. The inter-engagement of the axially biased coaxial coupling members of the present invention provides a tighter, more reliable connection with the quick installation convenience available in a push-pull connector. The coupling assembly of the coaxial connector of the present invention also provides radial forces to ensure sufficient engagement between the male and female connection members.

Figure 1:
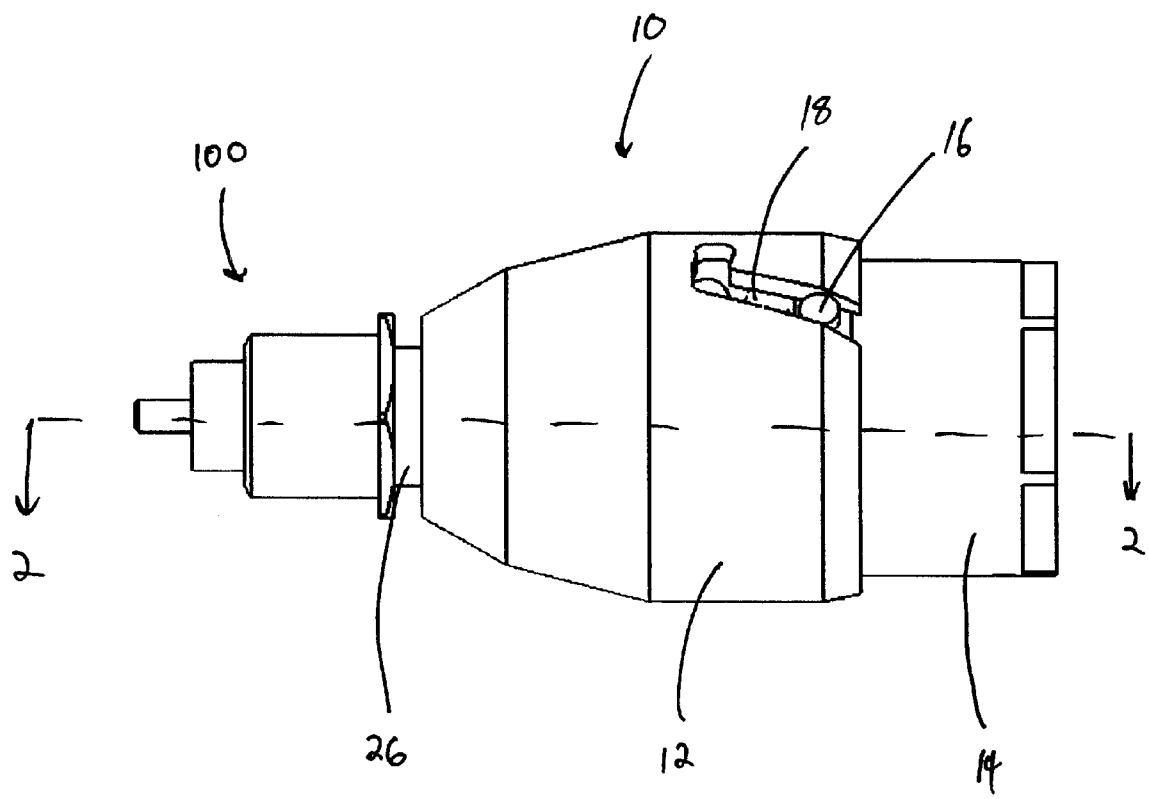
FIG. 1 is a side elevational view of one embodiment of a male coaxial connector constructed in accordance with the principles of the present invention, the male coaxial connector positioned in the process of mating with a female connector.

Referring first to FIG. 1 there is shown a side elevational view of one embodiment of the male coaxial connector 10 constructed in accordance with the principles of the present invention coupled with a female connector 100. In order to accommodate the female connector 100, a hollow sleeve 12 is provided that fits around the female connector 100 when the male coaxial connector 10 is engaged. In order to receive a connection member of a female connector 26, the sleeve 12 has an open front end. In order to receive a spring nut 14, he sleeve 12 has an open rear end. To facilitate the locking action of the male coaxial connector 10, the spring nut 14 has a locking finger 16 extending radially outward therefrom which fits wit in a locking groove 18 formed in the sleeve 12 such that when the spring nut 14 and the sleeve 12 are pushed together and rotated with respect to each other, the locking finger 16 is held in place at the end of the locking groove 18. This groove/finger assembly ensures that the male coaxial connector 10, when locked, cannot come unlocked when a pure axial force is applied to the assembly. It should be noted that more than one locking finger/locking groove combination may be provided. For the male coaxial connector 10 to work for its intended purpose it must be mounted at the end of a coaxial cable (as must the female connector 100). Such methods of connection are well known in the art. The preferred method for connection of the male coaxial connector 10 to a coaxial cable is disclosed in U.S. Pat. No. 5,802,710 which is incorporated by reference herein for such teachings.

Figure 2:
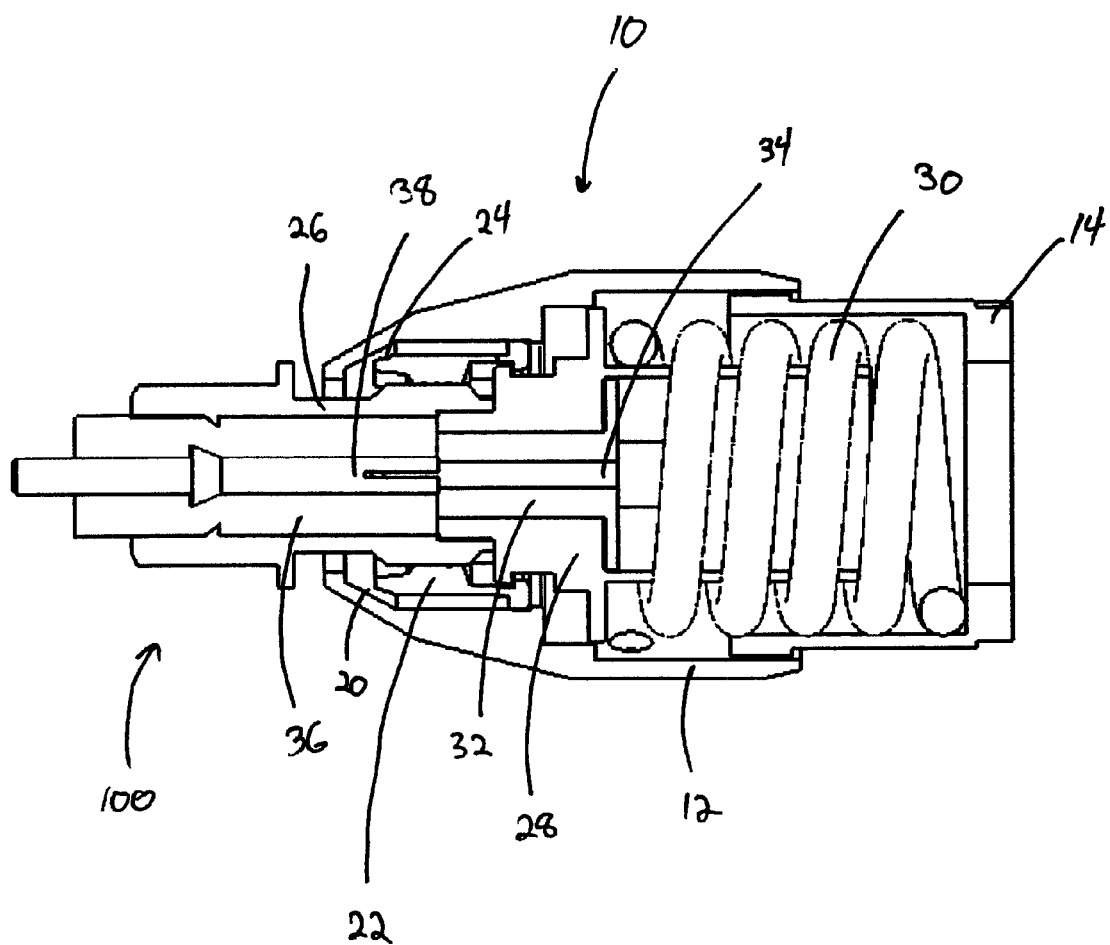
FIG. 2 is a side elevational, cross-sectional view of the male coaxial connector of FIG. 1 taken along lines 2—2 thereof and illustrating the post mated, unlock d position of said male coaxial connector thereof.

Referring now to FIG. 2, there is shown a side elevational, cross-sectional view of the male coaxial connector 10 of FIG. 1 in a mated, unlocked position. In order to provide outer electrical communication between the male coaxial connector 10 and the female connector 100, the connection member of the female connector 26 abuts the connection member of the male connector 28 and both connection members are constructed of electrically conductive material. These connection members serve as the outer conductors of the coaxial connection between the male and female connectors. To provide inner electrical communication between the male coaxial connector 10 and the female connector 100, an inner conductor 34 o the male coaxial connector 10 is provided within the connection member of the male connector 28 and is received in the inner conductor region 38 within the female connector 100. In order to insulate the inner conductors from the outer conductors, the male coaxial connector 10 and the female connector 100 are provided with male and female insulators 32, 36 respectively, that electrically isolate the outer conductors from the inner conductors. It is well known in the industry to utilize rubber, plastic or the like as insulating material within coaxial connectors, and likewise the use of brass, copper and similar electrically-conducting material for the construction of the conducting portions of the male coaxial connector 10, as well as the female connector 100.

Still referring to FIG. 2, in order to hold the connection member of the female connector 26 in place when it is inserted into the male coaxial connector 10, a spring basket 22 is adapted for receiving the connection member of the female connector 26. In order to translate axial force into radial force, the spring basket 22 has an angular front surface 24 which is adapted for engaging the internal angular surface 20 of the sleeve 12 when the sleeve 12 is moved in a rearward direction with respect to the spring basket 22. This relationship will be discussed in further detail below. In order to bias the male coaxial connector 10 to its unlocked position, a spring 30 is positioned around the connection member of the male connector 28 and within the hollow front end of the spring nut 14 applying equal and opposite axial forces on these two components when the spring 30 is compressed. The spring 30 also urges the connection member of the male connector 28 into electrical engagement with the connection member of the female connector 26 when the male coaxial connector 10 is in its mated, locked position. This relationship will be discussed in further detail below.

Figure 3:
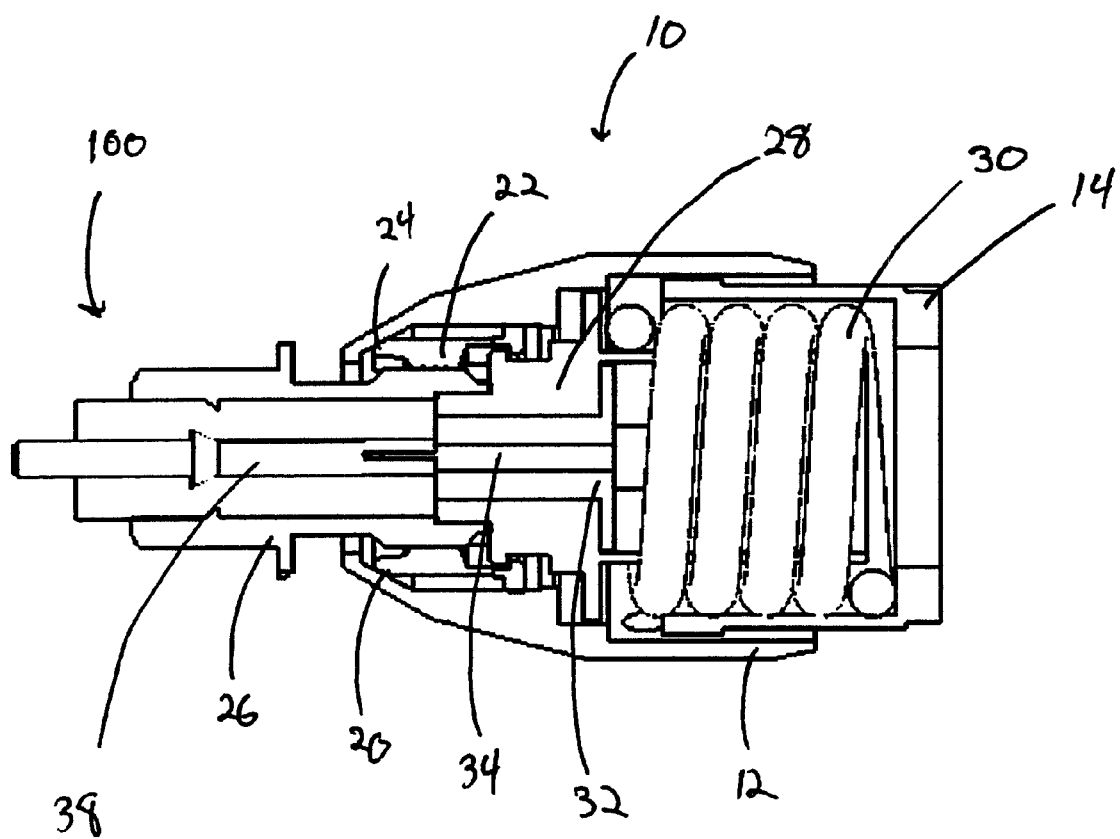
FIG. 3 is a side elevational, cross-sectional view of the male cc axial connector of FIG. 1 further illustrating the mated, locked position of said male coaxial connector thereof.

Referring now to FIG. 3, the male coaxial connector 10 is shown in its mated, locked position. To lock the male coaxial connector 10, the sleeve 12 is moved in a rearward axial direction with respect to the spring nut 14 while the connection member of the female connector 26 is mated against the connection member of the male connector 28. As the sleeve 12 moves in the rearward axial direction with respect to the spring nut 14, the locking finger 16 of the spring nut 14 travels down the locking groove 18 of the sleeve (see FIG. 1) such that the sleeve 12 must be forced against and rotated with respect to the spring nut 14 with sufficient force for the male coaxial connector 10 to be held in its locked position by the locking finger 16/locking groove 18 relationship (FIG. 1).

Still referring to FIG. 3, in order to securely hold the female connector 100 in place when the male coaxial connector 10 is locked, the internal angular surface 20 of the sleeve 12 engages the angular front surface 24 of the spring basket 22 as the sleeve is moved in a rearward axial direction to lock the male coaxial connector 10. The angular nature of the engagement of the internal angular surface 20 of the sleeve 12 and the angular front surface 24 of the spring basket 22 translates a portion of the axial force required to lock the male coaxial connector 10 into an inward radial force applied from the spring basket 22 on the connection member of the female connector 26. The radial force applied from the spring basket 22 is of sufficient magnitude to securely hold the female connector 100 in place.

In order to provide good electrical contact between the male coaxial connector 10 and the female connector 100, the male coaxial connector 10 of the present invention urges the connection member of the male connector 28 and the connection member of the female connector 26 together in both axial and radial directions. To ensure the radial engagement between the connectors, the spring basket 22 applies an inward radial force against the connection member of the female connector 26, which in turn applies an inward radial force on the connection member of the male connector 28 securing electrical communication between the two. Application of this radial force is accomplished when the sleeve 12 is moved in a rearward axial direction with respect to the spring nut 14 and the internal angular surface 20 of the sleeve 12 is forced into engagement with the angular front surface 24 of the spring basket 22. To ensure the axial engagement between the connectors, the spring 30 applies an frontal axial force on the connection member of the male connector 28 which urges it into axial engagement with the connection member of the female connector 26 securing electrical communication between the two. Because the inner conductor 34 and the male insulator 32 are fixed with respect to the connection member of the male connector 28, the spring 30 also urges the inner conductor 28 into engagement with the female inner conductor 38. Thus, when the male coaxial connector 10 of the present invention is locked, it provides both radial and axial forces on the female connector 100 to provide good electrical communication between the two.

Figure 4:
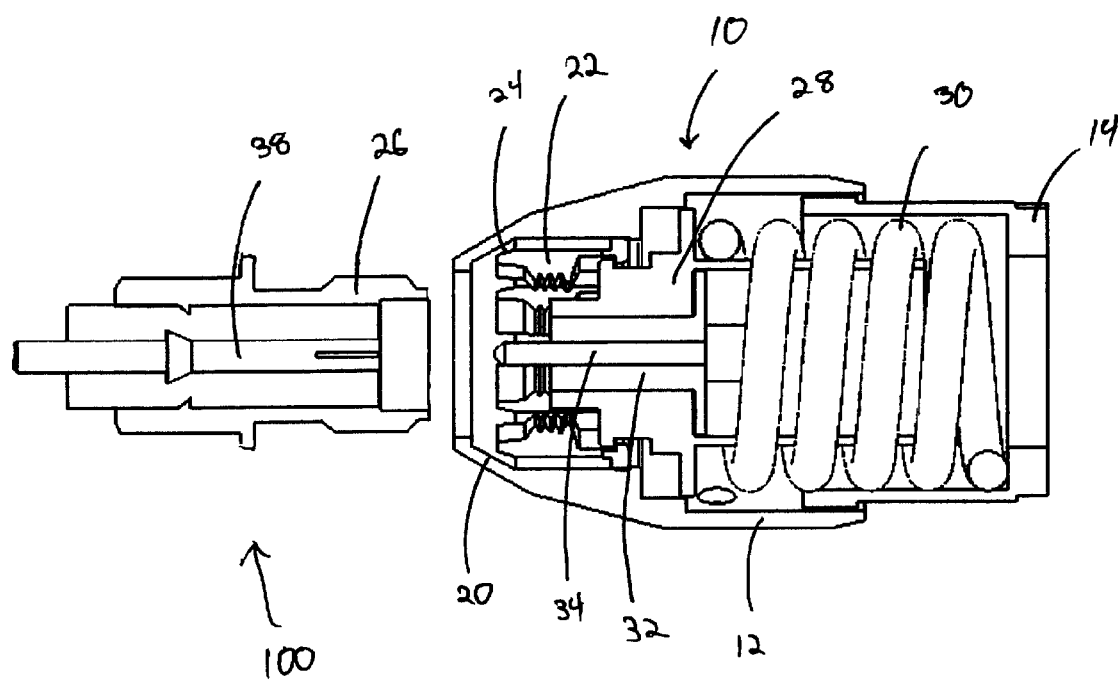
FIG. 4 is a side elevational, cross-sectional view of the male coaxial connector and female connector of FIG. 1 separated one from another further illustrating the pre-mated unlocked position of said male coaxial connector illustrating the operation thereof.

Referring now to FIG. 4, the male coaxial connector 10 of the present invention is shown in its unmated, unlocked position. To allow the female connector 100 to fit within the male coaxial connector 10, the front end of the sleeve 12 has an open diameter large enough to accommodate the connection member of the female connector 26. Additionally, the spring basket 22 is biased to an open position such that the connection member of the female connector 26 can fit within before the male coaxial connector 10 and female connector 100 are locked together. The functional relationship between the female connector 100 and the spring basket 22 will be discussed in further detail below.

Figure 5:
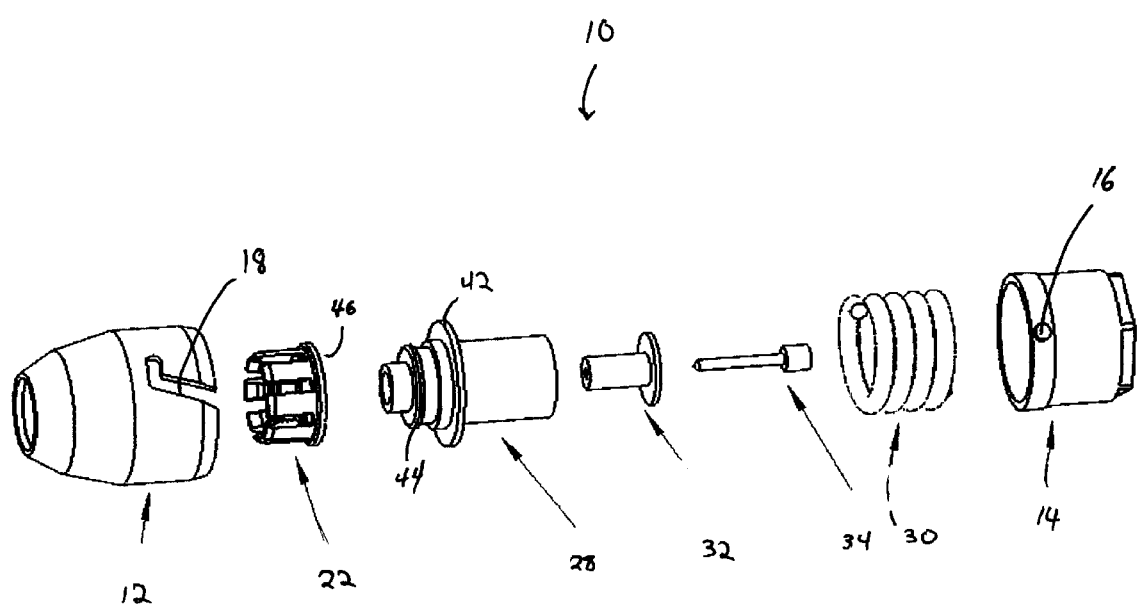
FIG. 5 is an exploded perspective view of the male coaxial connector of FIG. 1, constructed in accordance with the principles of the present invention.

Referring now to FIG. 5, there is shown an exploded view of the male coaxial connector 10 of the present invention. The inner conductor 34 is of a size such that, when assembled, it fits securely within a hole through the male insulator 32. Likewise, the male insulator 32 is of a size that, when assembled, it fits securely within the connection member of the male connector 28. In order to facilitate the internal electrical connection between the male coaxial connector 10 and the female connector 100, the front end of the inner conductor 34 protrudes from the connection member of the male connector 28 a distance sufficient to come into electrical contact with the female inner conductor 38 (FIG. 2) when the connectors are mated. To bias the male coaxial connector 10 to its open position and to urge the connection member of the male connector 28 toward the female connector when mated, the spring 30 is assembled around the connection member of the male connector 28 such that it abuts a radially extending ridge 42 on the connection member of the male connector 28; the other end of the spring 30 abuts a ridge (not shown) in the interior of the spring nut 14. In order to hold the spring basket 22 in place with respect to the connection member of the male connector 28, an inward-facing lip 46 on the spring basket 22 fits over and around a outward-facing lip 44 on the front of the connection member of the male connector 28. The sleeve 12 fits over the spring basket 22 and connection member of the male connector 28 assembly and over the front end of the spring nut 14 such that the locking finger 16 fits into the locking groove 18 of the sleeve 12.

Figure 6:
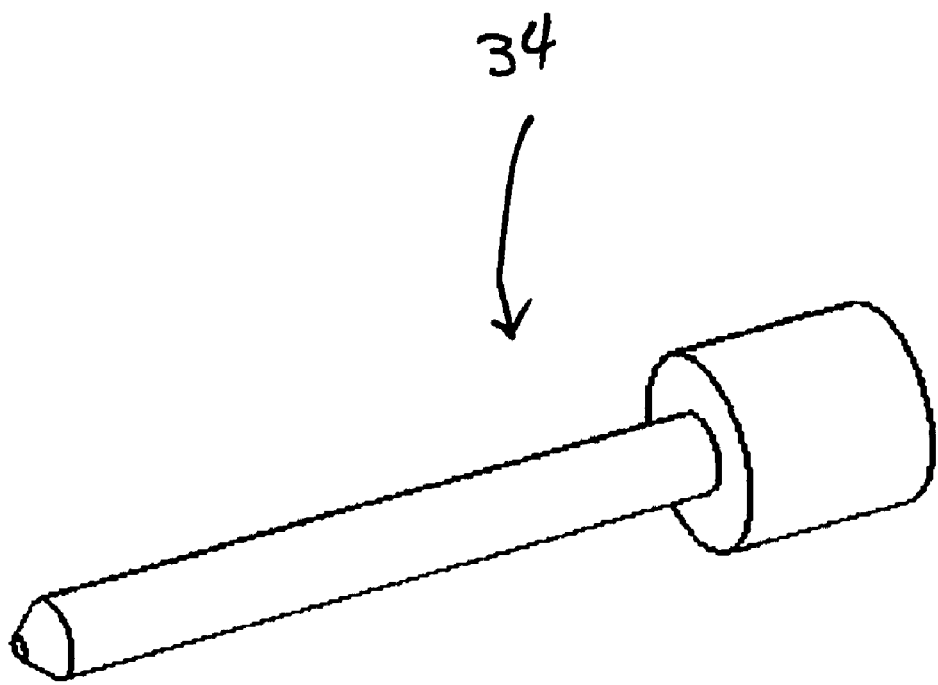
FIG. 6 is an enlarged, perspective view of the inner conductor of the male coaxial connector illustrated in FIG. 5.

Referring now to FIG. 6 there is shown a side elevational view of the inner conductor 34. In order to provide electrical communication between a standard coaxial cable (not shown) and the female inner conductor 38 (not shown) the inner conductor 34 must be made of an electrically conductive material. As stated above, to ensure a secure fit between the inner conductor 34 and the male insulator 32, the diameter of the front portion of the inner conductor 34 is approximately the same as the diameter of the hole formed through the male insulator 32. When the inner conductor 38, male insulator 32, and connection member of the male connector 28 are assembled, the front portion of the inner conductor 34 protrudes in an axial direction outwardly from the connection member of the male connector 28. This protrusion allow the inner conductor 34 to be received within the female inner conductor 38 when the male coaxial connector 10 is engaged with a female connector 100.

Figure 7:
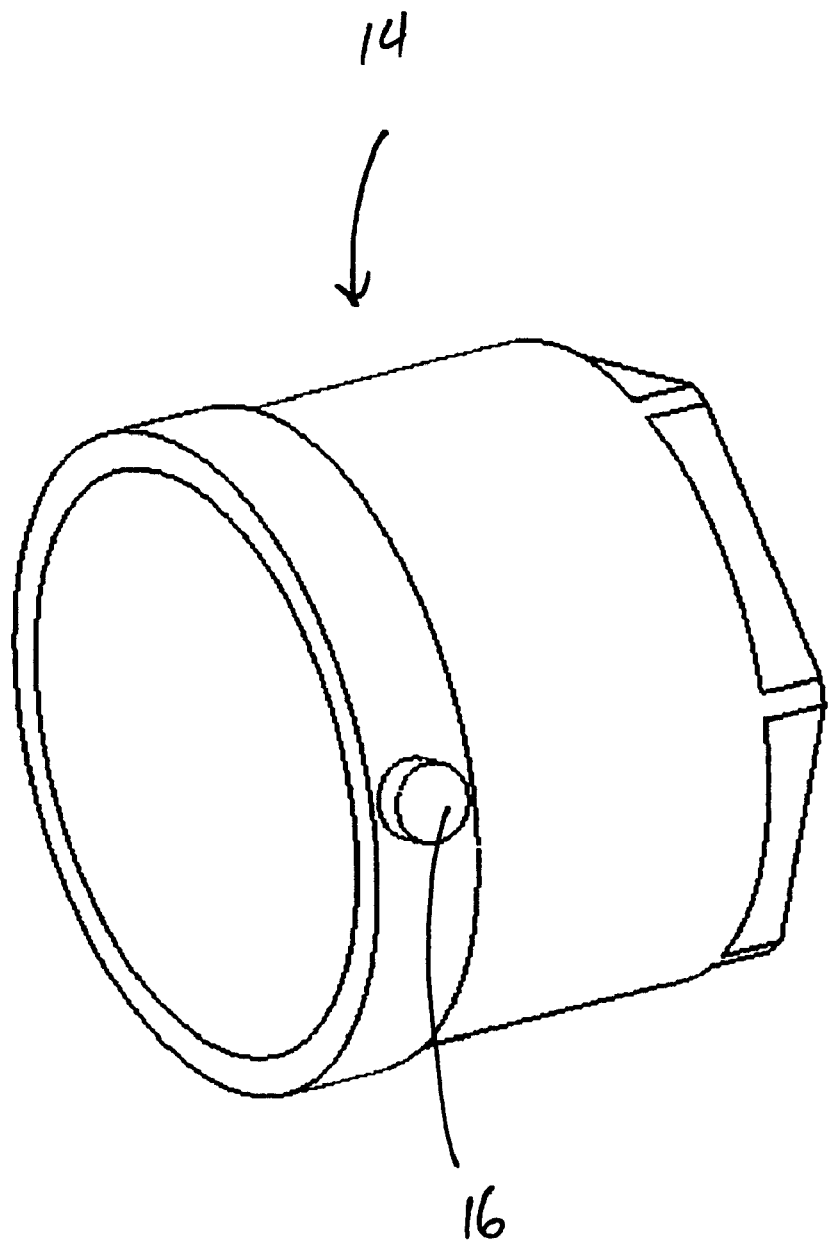
FIG. 7 is an enlarged, perspective view of the spring nut of the male coaxial connector of FIG. 5.

Referring now to FIG. 7 there is shown a perspective view of the spring nut 14 of FIG. 1. In order to facilitate engagement of the spring nut 14 with the sleeve 12, the spring nut has at least one locking finger 16 extending radially outward from the exterior of the locking nut 14 that engages the locking grooves 18 of the sleeve 12 (not shown). To accommodate the connection member of the male connector 28 and the spring 30, the internal diameter of the frontal portion of the spring nut 14 must be at least as large as that of the spring 30. In order to allow a coaxial cable to pass through, the internal diameter of the rear portion of the spring nut 14 must be at least as large as the outer diameter of the coaxial cable (not shown). To allow a user to easily lock the male coaxial connector 10, the external rear portion of the spring nut 14 is angled into planes whereas the remainder of the spring nut 14 is generally rounded. This allows a user to easily grip the spring nut 14 with a tool, such as a pair of pliers, to make locking the male coaxial connector 10 easier than if the user was attempting to lock the male coaxial connector 10 by hand. The preferred tool for this operation will be discussed in detail below.

Figure 8:
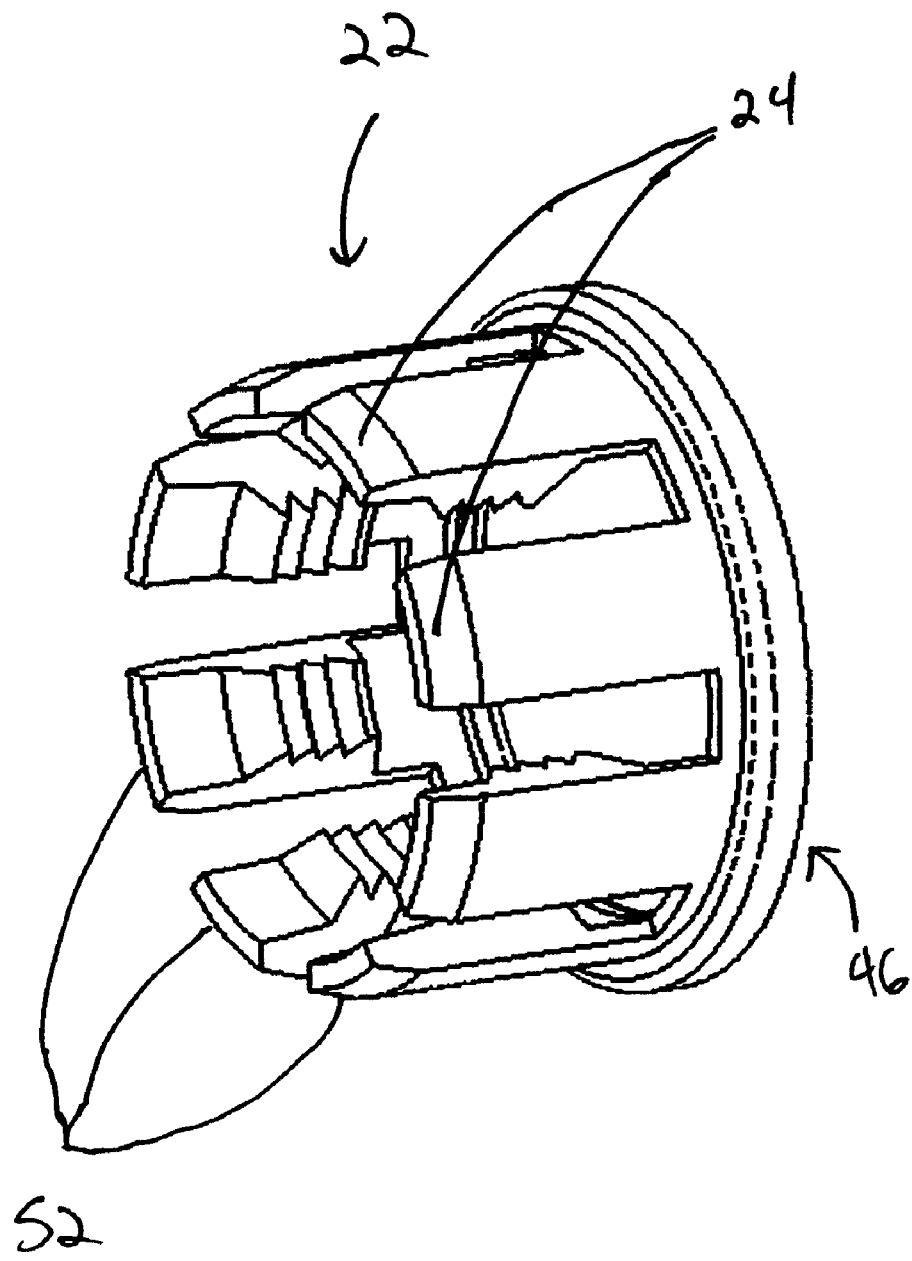
FIG. 8 is an enlarged, perspective view of the spring basket of he male coaxial connector of FIG. 5.

Referring now to FIG. 8, there is shown a perspective view of the spring basket 22. In order to allow front end of the spring basket 22 to compress evenly upon the connection member of the female connector 26 (not shown) when it is inserted therein, the frontal portion of the spring basket 22 is divided into equally spaced tines 52. Each tine 52 has an angular front surface 24 that engages the internal angular surface 20 of the sleeve 12 and translates axial force from the sleeve 12 into radial compressive forces onto the connector member of the female connector 26 (not shown). In order to provide better gripping forces on a threaded connector member of a female connector 26 (not shown), the internal faces of the tines 52 are threaded to engage the threads on the connector member of the female connector 26 (not shown). Also, in order to hold the spring basket 22 in place with respect to the connection member of the male connector 28 (not shown), an inward-facing lip 46 on the spring basket 22 fits over and around a outward-facing lip 44 on the front of the connection member of the male connector 28.

Figure 9A:
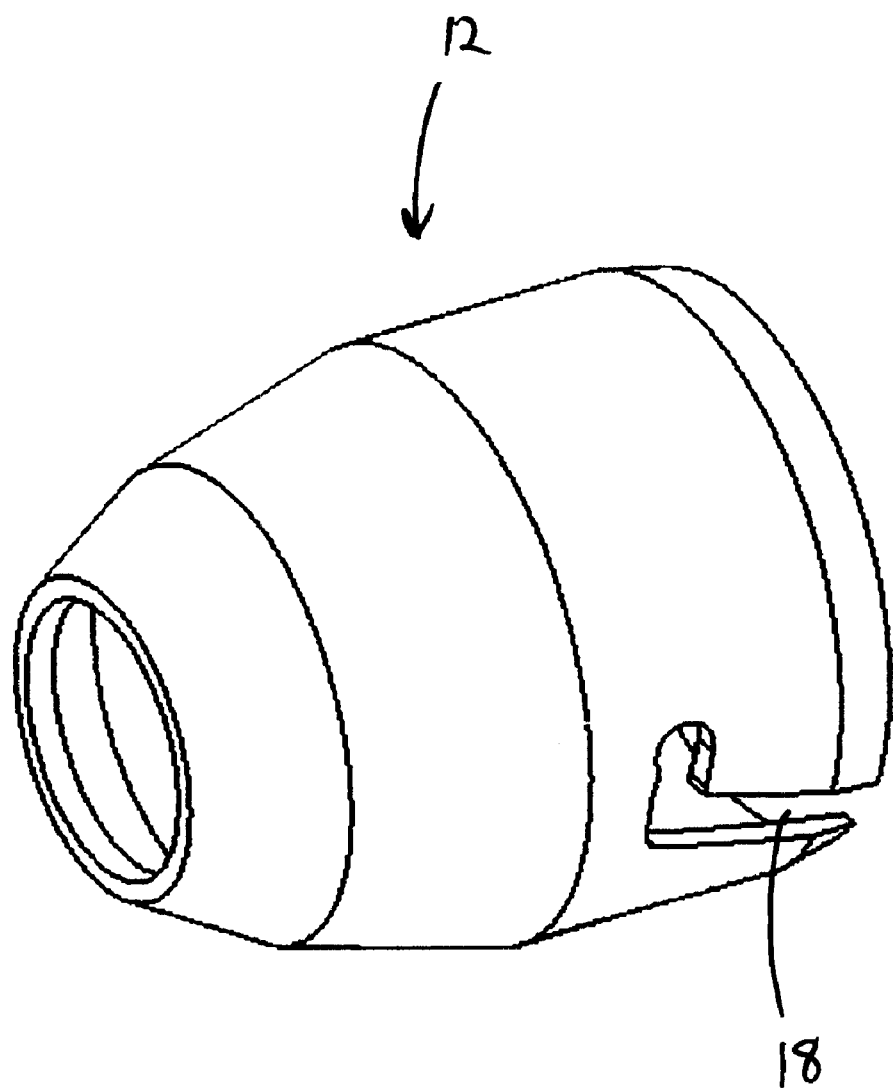
FIG. 9A is an enlarged, perspective view of the sleeve of the male coaxial connector of FIG. 5.
Figure 9B:
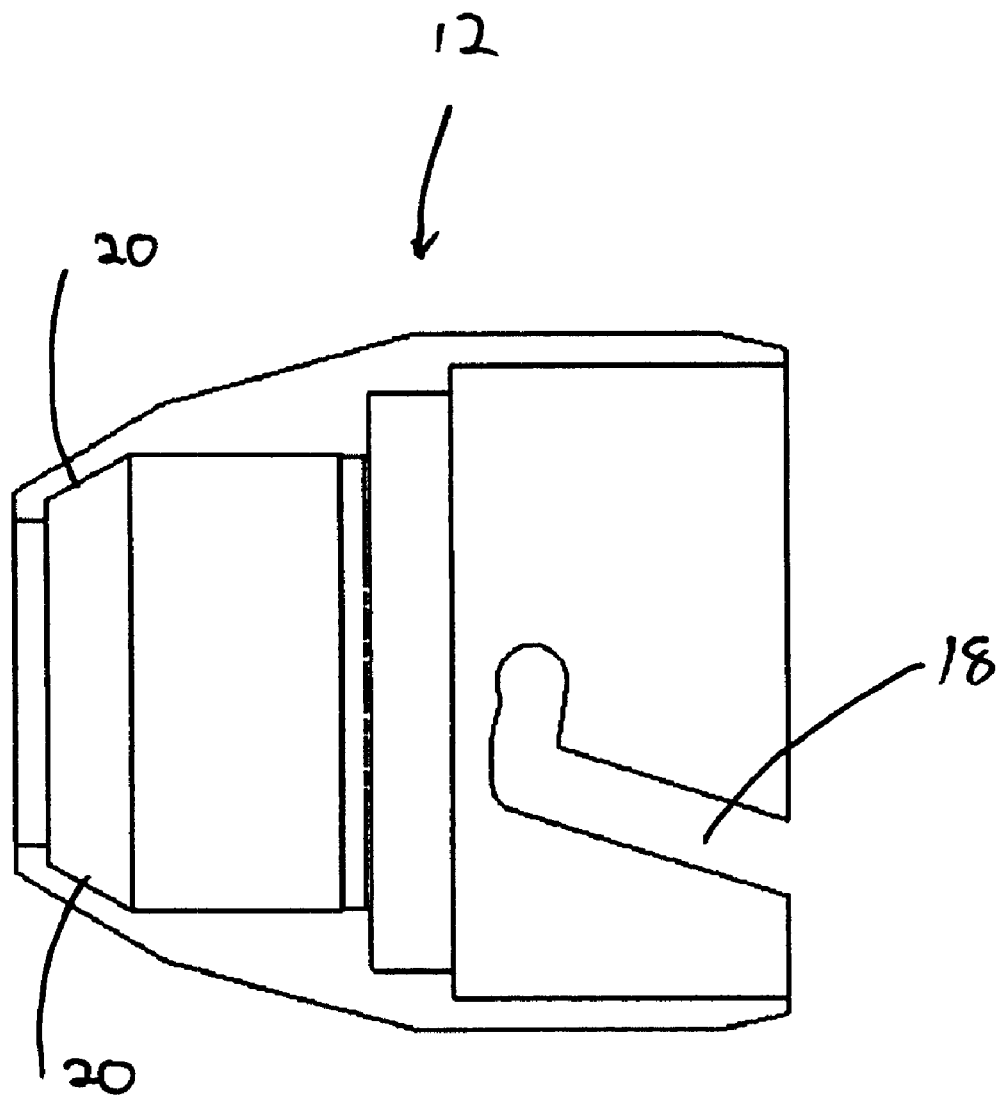
FIG. 9B is a side elevational, cross-sectional view of the sleeve of FIG. 9A.

Referring now to FIGS. 9A and 9B there is shown a perspective view of the sleeve 12 and a cross-sectional view of the sleeve, respectively. In order to facilitate locking of the male coaxial connector 10, at least one locking groove 18 is cut into the sleeve 18. The locking groove is adapted to receive the locking finger 16 of the spring nut 14 such that when the spring nut 14 and the sleeve 12 are pushed together in an axial direction with sufficient force and rotated with respect to each other, the male coaxial connector 10 is in its locked position and will not come unlocked with the application of a purely axial force. In order to provide compressive force on the female connector 100 (not shown), the interior of the front end of the sleeve 12 has an internal angular surface 20 adapted to engage the angular front surfaces 24 of the tines 52 of the spring basket 22 (see FIG. 8). Thus, when the sleeve 12 is pushed in a rearward axial direction with an axial force with respect to the spring basket 22, the internal angular surface 20 engages the angular front surfaces 24 of the tines 52 of the spring basket 22 and translates some of the axial force into radial compression forces on the tines 52 of the spring basket 22, which in turn compress the connector member of the female connector 26 (see FIG. 8).

Figure 10:
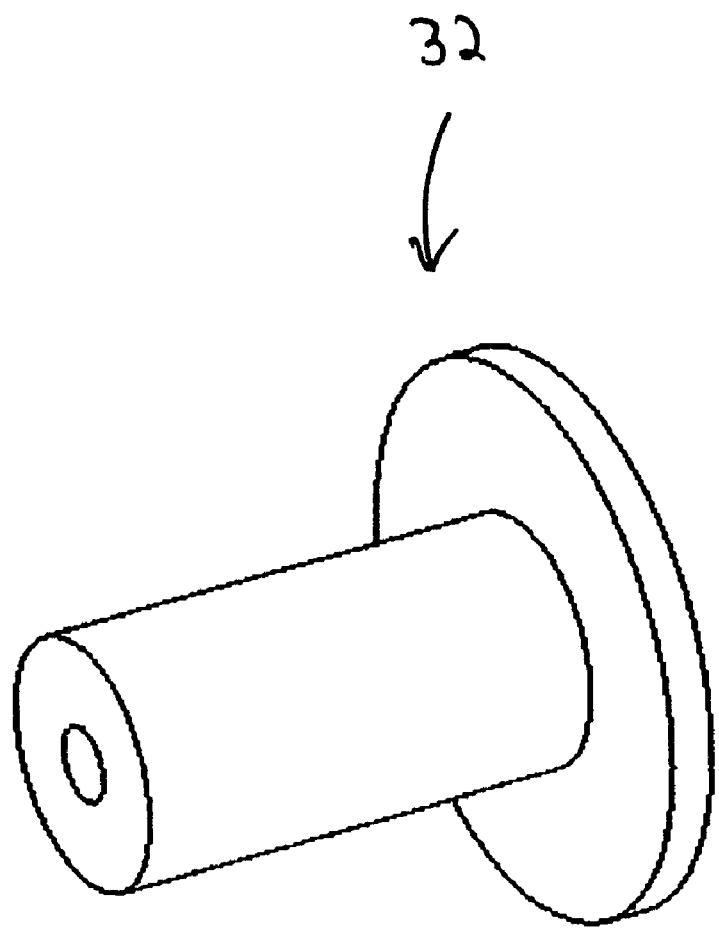
FIG. 10 is an enlarged, perspective view of the male insulator of the male coaxial connector of FIG. 5.

Referring now to FIG. 10, the male insulator 32 is shown. To accommodate the inner conductor 34, a hole of approximately the same diameter as the frontal portion of the inner conductor 34 is formed therethrough. This ensures that the inner conductor 34 fits tightly within the male insulator 32 when the male coaxial connector 10 is assembled. To ensure that the male insulator 32 fits tightly within the connection member of the male connector 28, the outer diameter of the frontal portion of the male insulator 32 is approximately the same as the inner diameter of the frontal portion of the connection member of the male connector 28.

Figure 11A:
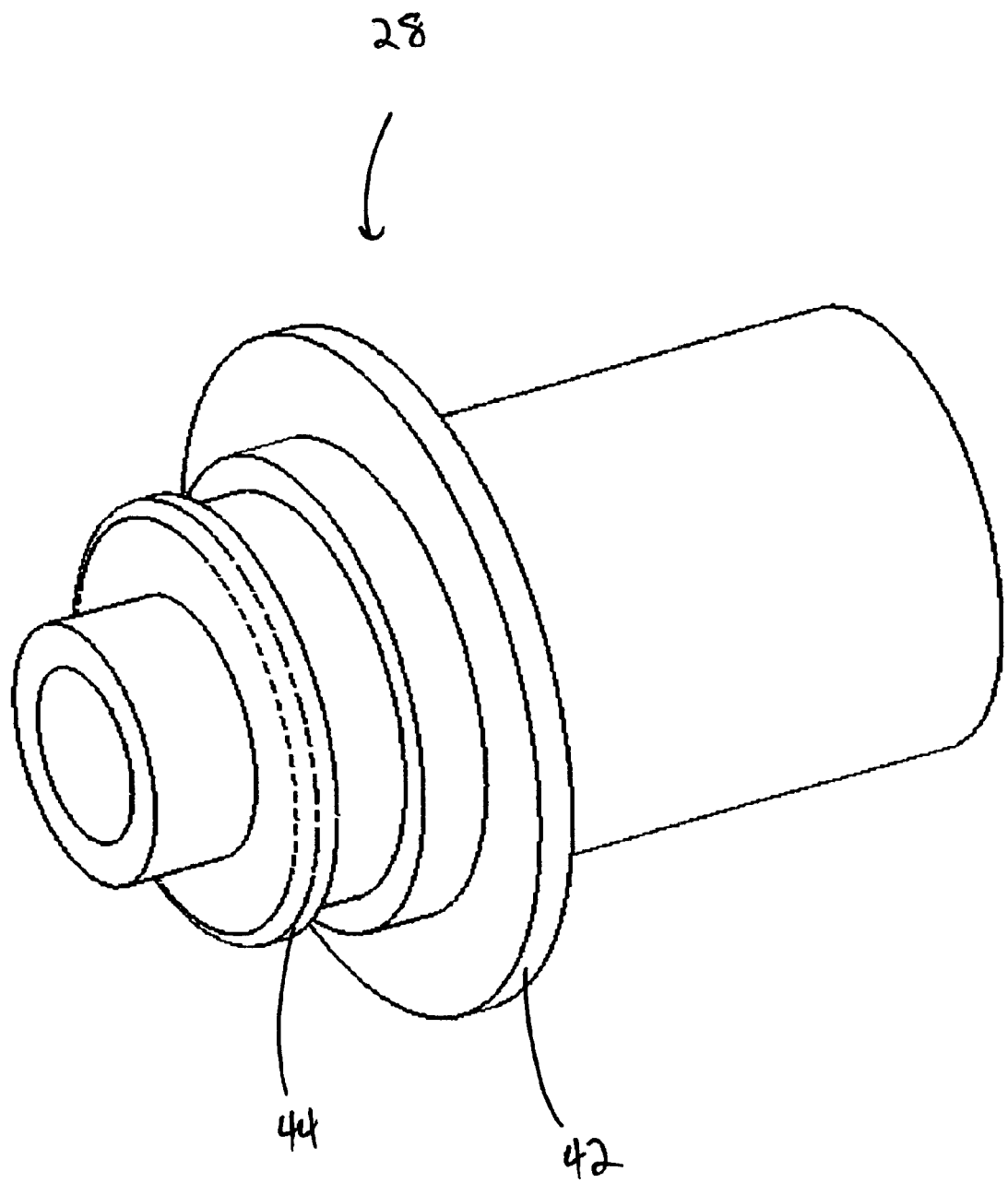
FIG. 11A is an enlarged, perspective view of the connection member of the male connector of FIG. 5.
Figure 11B:
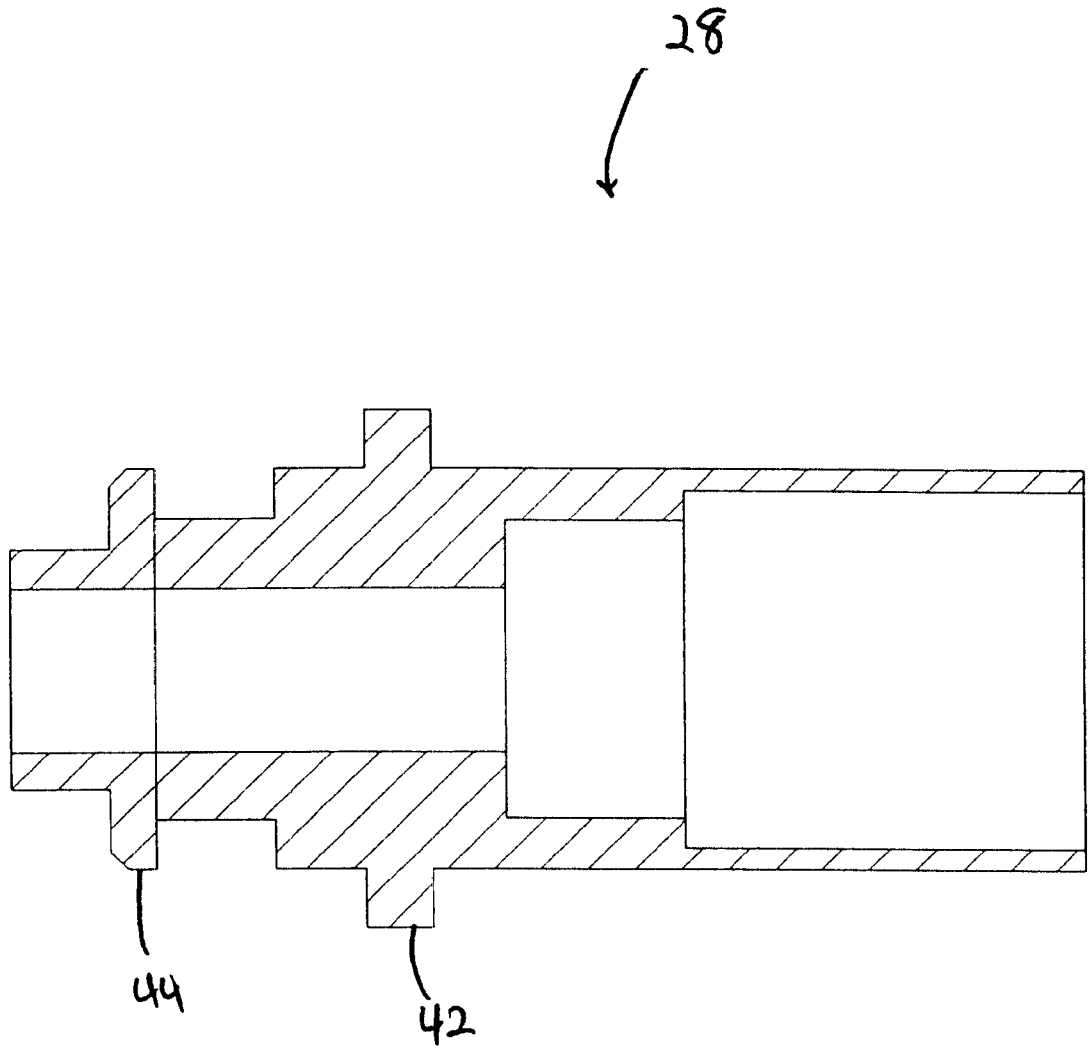
FIG. 11B is a side elevational, cross-sectional view of the connection member of the male connector of the male coaxial connector of FIG. 5.

Referring now to FIGS. 11A and 11B, there is shown a perspective view and a cross-sectional view of the connection member of the male connector 28, respectively. In order to allow the spring 30 (not shown) to apply an axial force on the connection member of the male connector 28, a radially extending ridge 42 extends outwardly therefrom. Also, as described above, in order to hold the spring basket 22 in place with respect to the connection member of the male connector 28, an inward-facing lip 46 on the spring basket 22 fits over and around a outward-facing lip 44 on the front of the connection member of the male connector 28. To ensure that the male insulator 32 (not shown) fits tightly within the connection member of the male connector 28, the inner diameter of the frontal portion of the connection member of the male connector 28 is approximately the same as the outer diameter of the frontal portion of the male insulator 32 (see FIG. 2).

Figure 12:
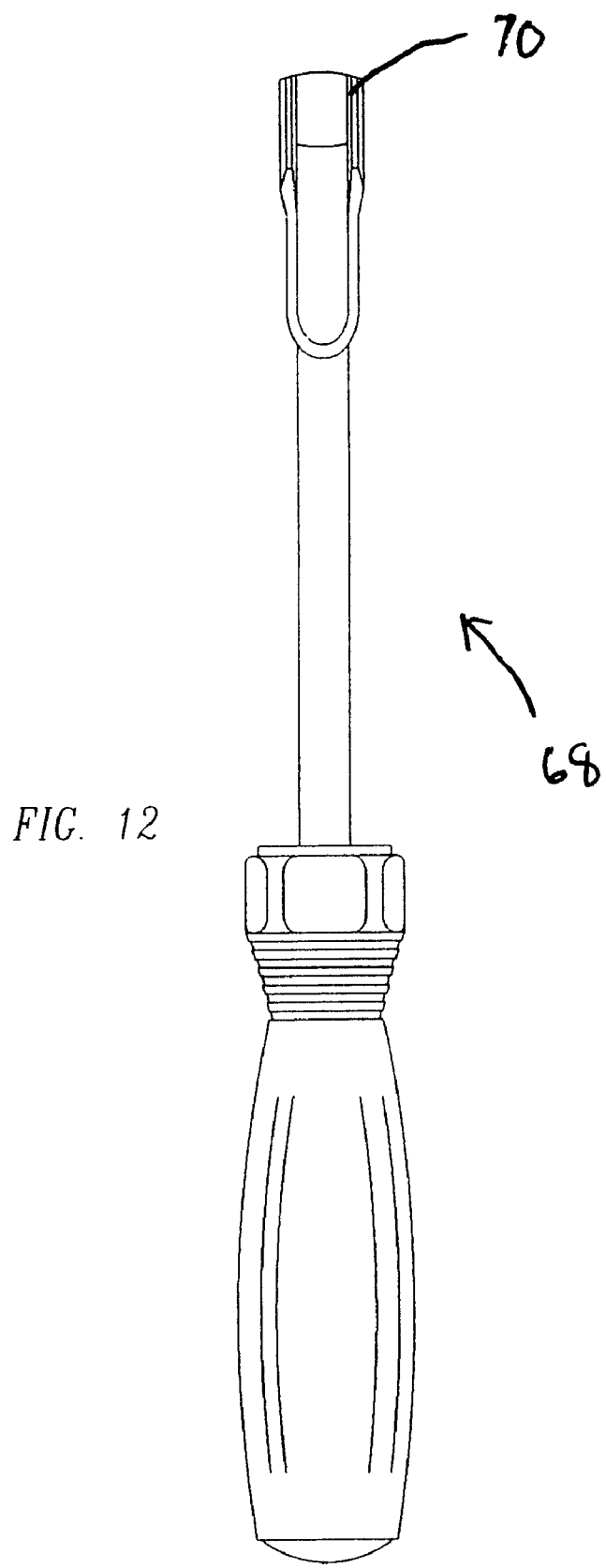
FIG. 12 is a side elevational view of a tool specifically adapted for facilitating the engagement and actuation of the male coaxial connector of FIG. 1.

Referring now to FIG. 12, there is shown a elevational view of a tool 68 for locking the male coaxial connector 10 of the present invention. To allow the tool 68 to fit over the rear end of the spring nut 14 (FIG. 7) and over a coaxial cable that the male coaxial connector 10 is attached to, the tool 68 has a cut-away hexagonal head 70 that fits over the angled planes of the rear of the spring nut 14. Other types of cut-away heads may be used (such as square, octagonal, etc.) as long as the tool 68 fits whatever shape the rear portion of the spring nut 14 is formed into. To allow a user to easily lock the male coaxial connector 10 of the present invention, the user places the cut-away hexagonal head 70 of the tool 68 over the rear portion of the spring nut 14. With his or her other free hand, the user grips the sleeve 12 and pushes the sleeve 12 and the spring nut 14 together by applying opposite axial forces on the hand holding the sleeve and the hand holding the tool 68. As the locking finger 16 of the spring nut 14 travels up the locking groove 18 of the sleeve 12, the user rotates the sleeve 12 (or the spring nut 14) with respect to the spring nut 14 (or the sleeve 12) locking the male coaxial connector 10 in place.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. A coaxial connector of the type wherein a connection member of a female connector is adapted for secure engagement with a connection member of a male connector, wherein said coaxial connector is positionable substantially around said connector member of said female connector, said coaxial connector defining an axial direction along its major axis, said coaxial connector comprising:

a spring basket positioned around said connection member of said male connector, said spring basket having an angular frontal surface;

a sleeve reciprocally positioned around said spring basket and said connection member of said male connector, said sleeve having an internal angular surface for engaging said angular frontal surface of said spring basket, and said sleeve having at least one locking groove extending substantially parallel to the major axis along a portion of the body thereof;

a spring nut having a hollow front end disposed within said sleeve and further being formed with at least one upstanding locking finger disposed within said at least one locking groove of said sleeve; and a spring partially disposed within said hollow front end of said spring nut, said spring positioned between said spring nut and said connection member of said male connector respectively such that when said spring nut is pushed in a forward axial direction relative to said sleeve to lock said coaxial connector said spring is compressed and said internal angular surface of said sleeve engages said angular frontal surface of said spring basket forcing said spring basket to apply a radially inward force on said connection member of said female connector holding said female connector in place, said spring providing an axial force on said connection member of said male connector and forcing said connection member of said male connector into engagement with said connection member of said female connector.

2. The coaxial connector of claim 1 wherein said spring basket comprises a plurality of tines adapted to radially compress said connection member of said female connector.

3. The coaxial connector of claim 1 wherein the rear end of said spring nut has a plurality of substantially flat sides to facilitate the use of a tool to lock said coaxial connector.

4. The coaxial connector of claim 3 wherein said plurality of substantially flat sides numbers four.

5. The coaxial connector of claim 3 wherein said plurality of substantially flat sides numbers six.

6. The coaxial connector of claim 1 wherein said sleeve has a plurality of locking grooves and said spring nut has as many locking fingers as said sleeve has locking grooves.

7. The coaxial connector of claim 1 wherein said connection member of said male connector is made of electrically conductive material.

8. The coaxial connector of claim 1 wherein said spring basket has an inward-facing lip on the rear portion thereof adapted to fit over and around an outward-facing lip on the frontal portion of said connection member of said male connector.

* * * * *